United States Patent [19]

Kitamura

[11] Patent Number: 4,546,532
[45] Date of Patent: Oct. 15, 1985

[54] AUTOMATIC TOOL CHANGING APPARATUS

[75] Inventor: Koichiro Kitamura, Takaoka, Japan

[73] Assignee: Kitamura Machinery Co., Ltd., Takaoka, Japan

[21] Appl. No.: 516,559

[22] Filed: Jul. 25, 1983

[30] Foreign Application Priority Data

Jul. 30, 1982 [JP] Japan .............................. 57-133353

[51] Int. Cl.⁴ ........................................... B23Q 3/157
[52] U.S. Cl. ...................................... 29/568; 414/736
[58] Field of Search ...................... 29/568, 264, 426.3, 29/40, 42; 414/736

[56] References Cited

U.S. PATENT DOCUMENTS

| | | | |
|---|---|---|---|
| 3,449,823 | 6/1969 | Jerue | 29/568 |
| 3,760,491 | 9/1973 | Zankl et al. | 29/568 |
| 3,822,466 | 7/1974 | Noguchi et al. | 29/568 |
| 4,012,830 | 3/1977 | Ewertowski | 29/568 |
| 4,237,595 | 12/1980 | Kitamura | 29/26 A |
| 4,237,599 | 12/1980 | Buonauro et al. | 29/568 |

*Primary Examiner*—Z. R. Bilinsky
*Attorney, Agent, or Firm*—Fleit, Jacobson, Cohn & Price

[57] ABSTRACT

To effect the automatic changing of tools rapidly and provide a large number of tool pots with a small space in an automatically controlled machine tool, an automatic tool changing apparatus is positioned between the magazine proper and the spindle axis and an arm having a tool gripping claw at each end thereof is adapted to engage and disengage with the tools perpendicularly to the tool axis and the spindle axis, whereby the tool changing operation is accomplished by a series of movements including forward and backward movements, in-and-out movements, half-turn movements and spiral movements.

8 Claims, 8 Drawing Figures

AUTOMATIC TOOL CHANGING APPARATUS

BACKGROUND OF THE INVENTION

The present invention relates to an automatic tool changing apparatus for machine tools of the type controlled automatically such as NC machine tools.

With this type of machine tools, an automatic tool changing apparatus, selects the required tool from among a large number of tools accommodated in a magazine proper, supplies the selected tool to the spindle, removes the used tool from the spindle and changes the used tool for the required tool for the next machining operation, must be simple in construction and capable of rapidly performing smooth and positive operations. From the standpoint of operating efficiency and safety, it is also required that the working space is not reduced by the stock tools and the standby tools and that a sufficient working area is maintained. However, these requirements have not been necessarily met satisfactorily by conventional automatic tool changing apparatus. For instance, where the spindle axis and the tool axis of the magazine proper cross each other at right angles with a predetermined spacing therebetween, the tool of the magazine proper is first subjected to a so-called pot-down at the tool changing station. Then, the tool is picked up from the pot with a suitable clamping member, rotated through a suitable angle while being moved horizontally so as to align the tool axis with the spindle axis and then inserted into the spindle. In this case, while the pot-down maintains the spindle axis and the tool axis parallel to each other, making it possible to perform subsequent operations relatively easily, it is necessary to sequentially control two stages of operation, i.e., the pot-down operation of the magazine proper and the three-dimensional tool changing operation of the clamping member with the result that not only is the overall construction complicated, but also the number of tools which can be accommodated in the magazine proper is relatively small. There is another disadvantage that any attempt to increase the number of tools lengthens the magazine proper rearward and increases the installation space of the machine tool.

On the other hand, to extend a part of the magazine proper toward above the bed is not desirable from the standpoint of operating efficiency and safety, even though the tool changing can be made easier.

It will thus be seen that to ensure the desired smooth and positive operation of an automatic tool changing apparatus and to ensure the desired operating efficiency and safety are contradictory to each other in some respect, and, moreover, they will be affected greatly in dependence on the arrangement and construction of the magazine proper, thus tending to govern the destiny of this type of machine tool.

SUMMARY OF THE INVENTION

In view of the above-mentioned deficiencies in the prior art, the present invention has been devised mainly for the purpose of ensuring convenience of this type of machine tool and therefore it is an object of this invention to provide an automatic tool changing apparatus which not only ensures the smooth, positive and rapid performance of a series of tool changing operations, but also ensures a sufficient working space.

It is another object of this invention to provide an automatic tool changing apparatus so designed that during the tool changing operation the next tool is positioned as close to the axis of a spindle as possible so as to effect the tool changing operation rapidly, and also a standby pot is provided so as to protect the shank of the tool from dust and the like.

In accordance with the invention there is thus provided an automatic tool changing apparatus for an automatically controlled machine tool in which the axis of a spindle and the axis of a tool at the tool changing station of a magazine proper are arranged to preferably cross each other at right angles with a predetermined spacing therebetween, and the apparatus which is positioned between the spindle axis and the tool axis and swingable about an inclined shaft includes a moving member forwardly and backwardly movably arranged on a base mounted on a turning shaft, and an arm having a tool gripping claw at each end thereof and mounted on the moving member so as to make a half turn to either side and to move in and out in a direction perpendicular to the direction of movement of the moving member, with the gripping claws being arranged to cross at right angles the spindle axis and the tool axis, respectively.

DESCRIPTION OF THE PREFERRED EMBODIMENT

A preferred embodiment of the invention applied to an NC milling machine by way of example will now be described in detail with reference to the accompanying drawings.

Figure 1:
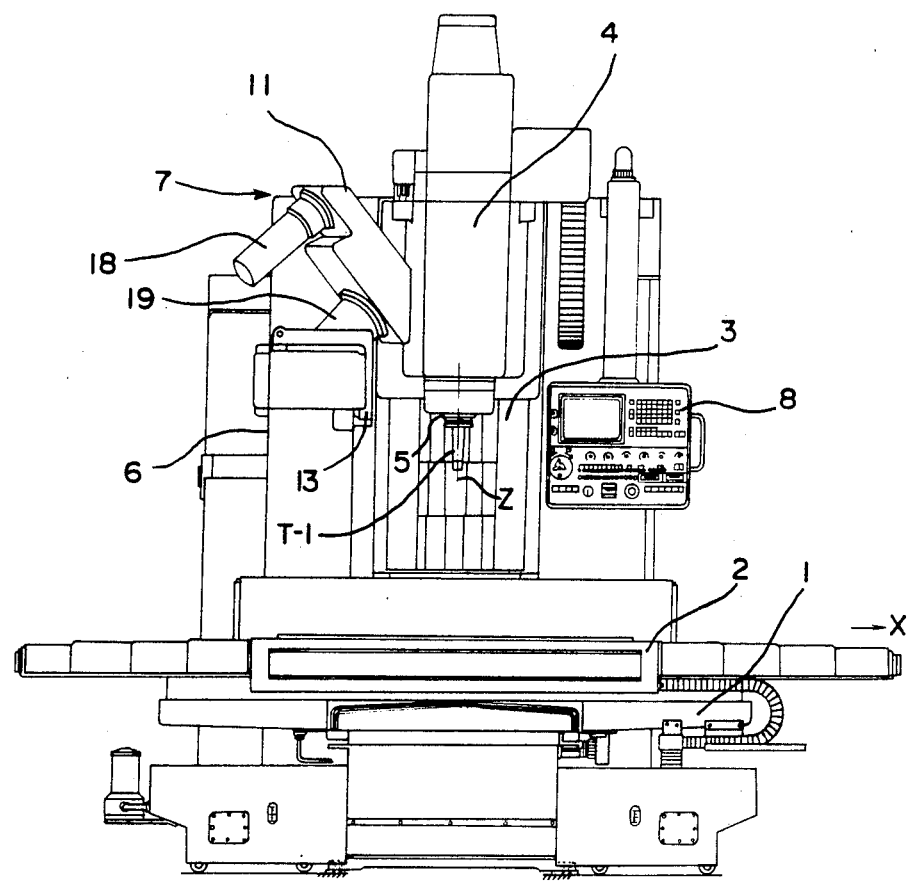
FIG. 1 is a front view of an NC milling machine incorporating an automatic tool changing apparatus according to the invention.
Figure 2:
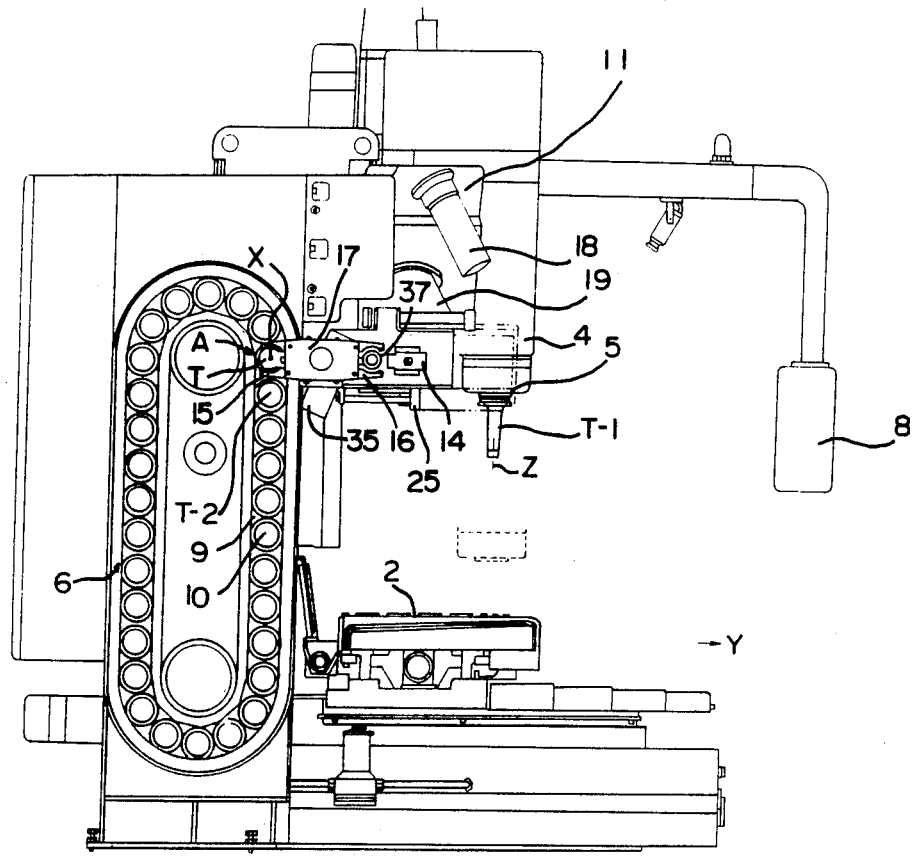
FIG. 2 is a side view of FIG. 1.

Referring to FIGS. 1 and 2, the NC milling machine includes mainly a bed 1, a table 2 movable in the directions of X and Y axes which are perpendicular to each other within the horizontal plane on the bed 1, a head 4 mounted on a column 3 in a vertical (Z axis) direction for vertical movement above the table 2, a spindle 5 rotatably mounted on the head 4, a magazine proper 6 mounted on one side of the column 3 so as to be fed intermittently in the Z-axis direction, and an automatic tool changing apparatus 7 provided according to the invention and arranged between the magazine proper 6 and the head 4, and these component parts are subject to the sequence control by a control panel 8.

The magazine proper 6 includes a plurality of pots 10 for receiving a large number of tools T which are mounted on a roller chain 9 extended over the top and bottom sprockets (not shown), and the row of the large number of pots 10 arranged in a longitudinal loop form makes it possible to provide as many tools T as possible. Also the fact that the magazine proper 6 is located in the rear of the table 2 makes it possible to utilize the space above the table 2. Moreover, since the magazine proper 6 does not extend a large distance beyond the rear of the table 2, despite the ability to accommodate a large number of tools, there is no danger of the installation space of the NC milling maching becoming so large. It is, rather, possible to make the required space equal to or less than that required previously.

The axis of the tool T received in each of the pots 10 of the roller chain 9 is directed in the X-axis direction and the corresponding tools are selectively removed and received at an upper position A by the automatic tool changing apparatus 7 which will be described later. In accordance with this embodiment, it is arranged so that the tool axis (X axis) at the tool changing station A of the magazine proper 6 and the spindle axis (Z axis) cross each other at right angles with a predetermined spacing therebetween.

The automatic tool changing apparatus 7 of the present invention is arranged between the spindle axis (Z axis) and the tool axis (X axis). As will be seen from FIGS. 3 to 7, its construction includes a housing 11 having its longitudinal axis inclined with respect to the X, Y and Z axes, respectively, and mounted on the column 3 to extend therefrom, a turning shaft 12 rotatably carried in the housing 11, a base 13 fixedly mounted on the turning shaft 12, a moving member 14 mounted to move forward and backward on the base 13, and an arm 17 mounted on the moving member 14, having tool gripping claws 15 and 16 at the ends thereof and adapted to make a half turn to either side and to move in and out in a direction perpendicular to the direction of movement of the moving member 14.

Figure 3:
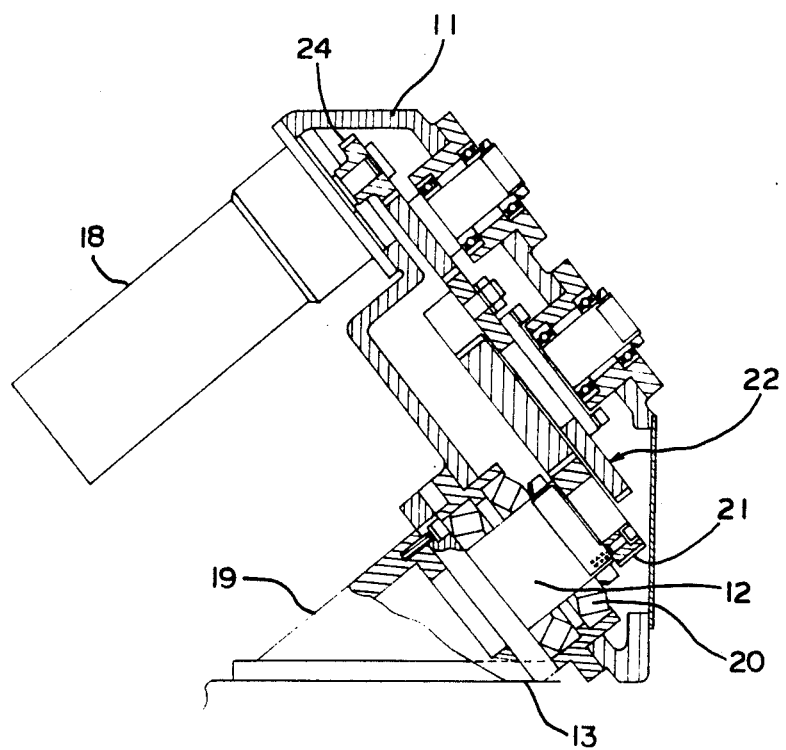
FIG. 3 is a sectional view showing the turning section of the automatic tool changing apparatus according to the invention.

The turning shaft 12 is rotated through a predetermined angle in a clockwise direction as looked from the above by a turning gear 18 comprising a geared motor as shown in Fig.3. In fact, a triangular turning bracket 19 is fixedly mounted on one end of the turning shaft 12 and the base 13 is mounted on the turning shaft 12 through the bracket 19. The turning shaft 12 is mounted in the housing 11 through a bearing 20 and a gear 24 of a motor 23 is connected through a gear reduction unit 22 with a gear 21 mounted on the base end of the swinging shaft 12.

Figure 4:
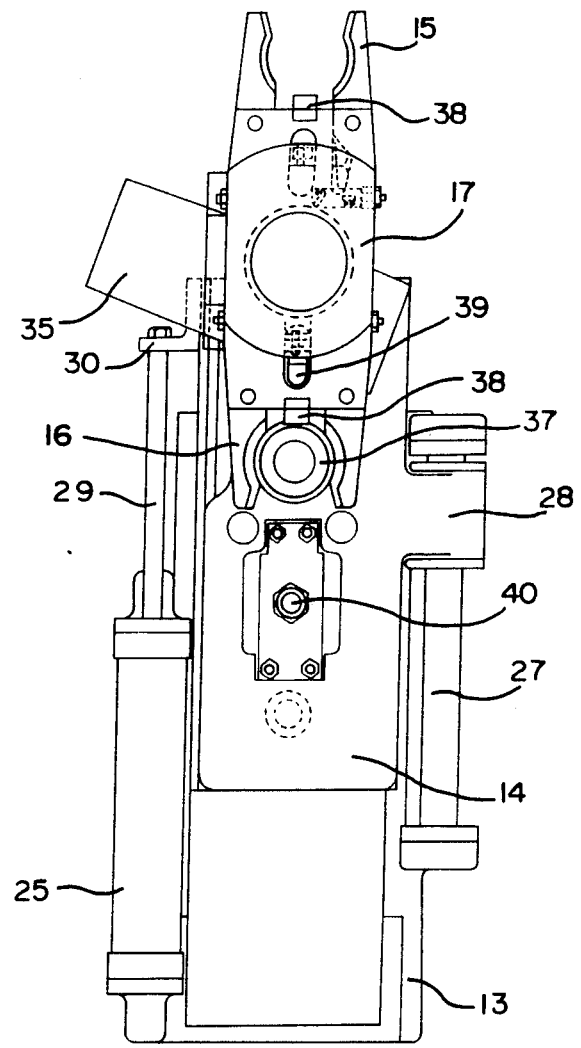
FIG. 4 is a front view of the tool gripping unit mounted on the turning section of FIG. 3.
Figure 5:
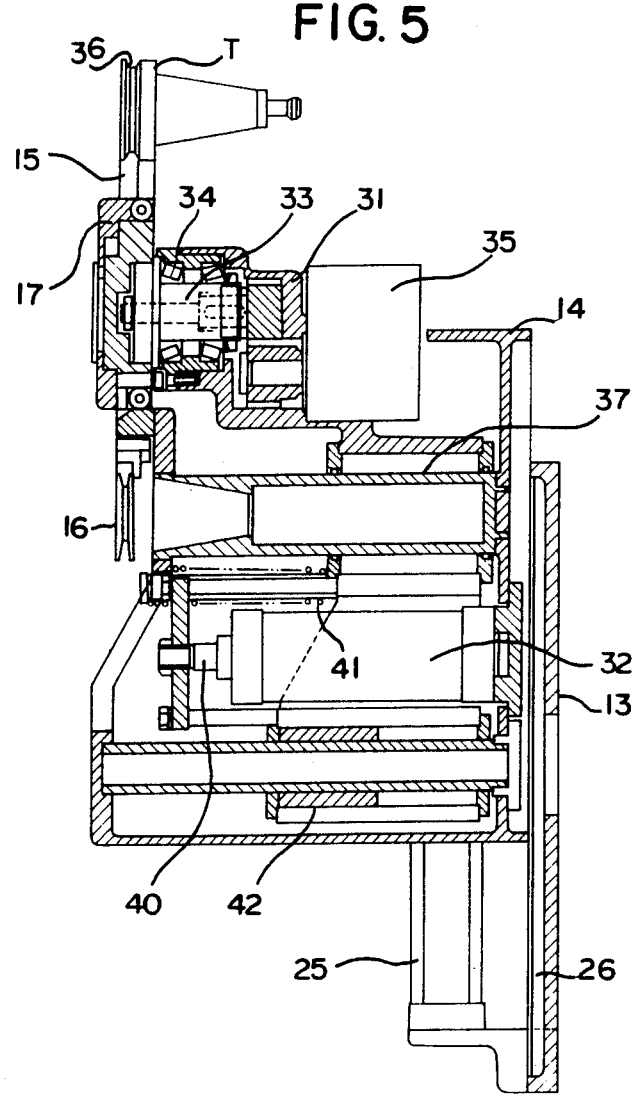
FIG. 5 is a longitudinal sectional side view of FIG. 4.
Figure 6:
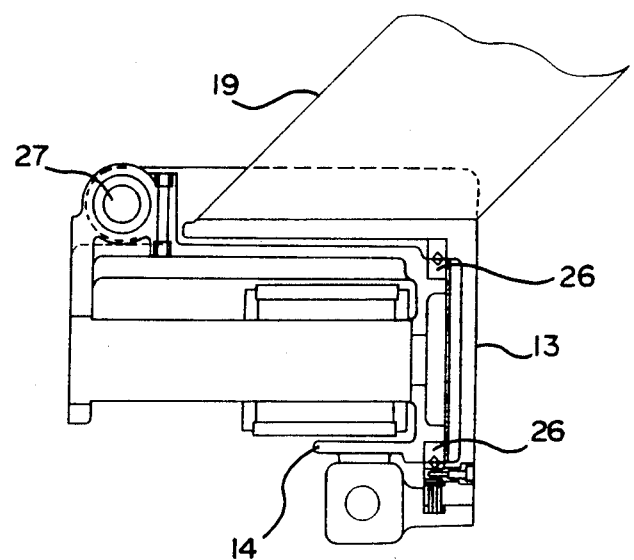
FIG. 6 is a bottom view of FIG. 5.

On the base 13 mounted at the forward end of the turning bracket 19 as shown in FIG. 6, the moving member 14 is slidably movable with a predetermined stroke by means of an air cylinder 25. More specifically, closed roller guides 26 are provided between the right-angled rear surface of the moving member 14 and the base 13, and a cylindrical guide support 28 extending along a guide bar 27 is provided at the forward end of the other upper surface of the moving member 14. A projecting piece 30 connected to the forward end of a piston rod 29 of the air cylinder 25 is provided on the lower surface of the moving member 14 parallel to its upper surface as shown in FIG. 4. While the front area of the moving member 14 is open, another moving frame 31 is mounted on the moving member 14 in such a manner that it is moved in and out in the front of the moving member 14 in a direction perpendicular to the direction of movement of the moving member 14, and the moving frame 31 is moved in and out with respect to the moving member 14 by an air cylinder 32. On the other hand, as shown in FIG. 5, a turning shaft 33 is mounted through a bearing 34 on one side of the moving frame 31, and the arm 17 having the tool gripping claws 15 and 16 at the ends thereof is perpendicularly attached to the forward end of the turning shaft 33 whose base end is connected to an actuator 35 for causing the turning shaft 33 to make a half turn.

The tool gripping claw 15 having a pair of opposing curved pieces and shaped like a fork is caused to elastically engage with an annular groove 36 formed in the body of the associated tool T in response to the forward movement of the moving member 14. Also, the other similar tool gripping claw 16 accommodates the tool gripped in this manner in a standby pot 37 and puts it in a standby condition. This standby pot 37 protects the shank of the tool T from dust and the like and it also makes it possible to rapidly attach and detach the tool from the spindle 5. Each of the tool gripping claws 15 and 16 is provided with a tool positioning notch 38 and a releasing notch 39

The air cylinder 32 for moving the moving frame 31 in and out is disposed between the moving frame 31 and the moving member 14 and the moving frame 31 is connected through a spring 41 to the forward end of a piston rod 40 of the air cylinder 32. The standby pot 37 is fixedly mounted concentrically, along with the other tool gripping claw 16, on the moving member 14 and it is movable relatively with the moving frame 31. Numeral 42 disignates a guide for the moving frame 31.

Figure 8:
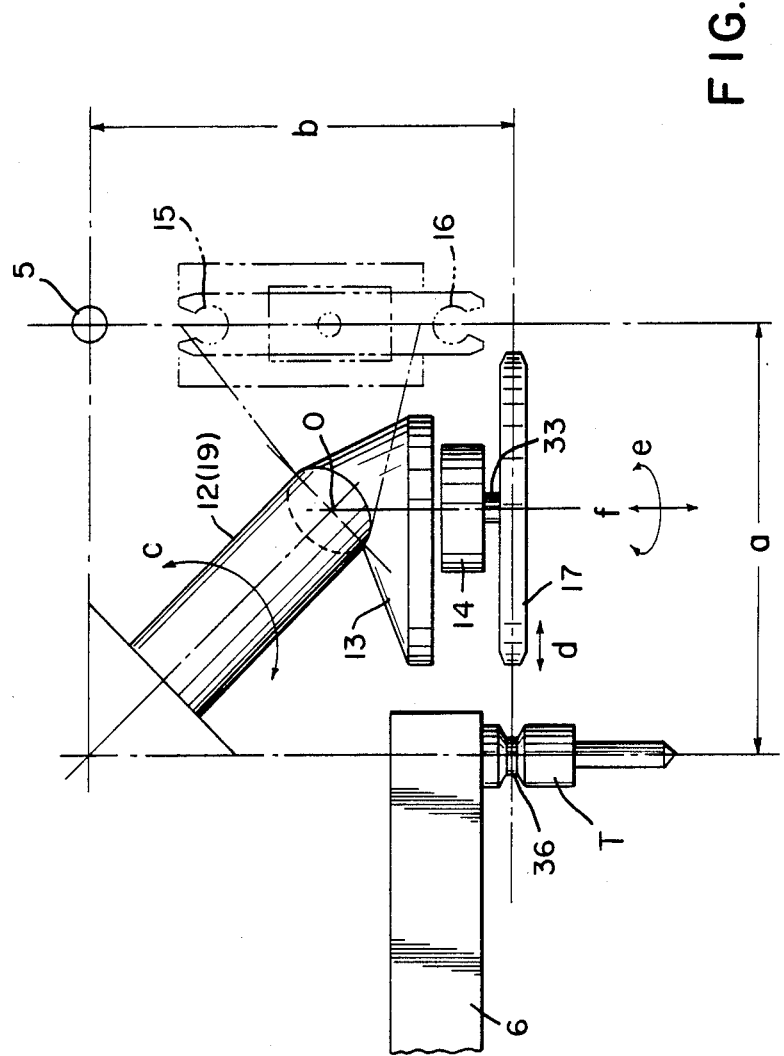
FIG. 8 is plan view showing the tool gripping unit in its two extreme positions.

FIG. 8 is a plan view of magazine proper 6, spindle axis 5, and turning shaft 12. In this view, the axis of turning shaft 12 is shown at an angle 45° with respect to each of the X, Y, and Z axes. Shaft 12 is rotatable about its own axis in the direction of arrow c, and when it so rotates it carries base 13, moving support member 14 and arm 17 from the position illustrated in full lines to the position illustrated in phantom. Moreover, moving support member 14 is movable linearly in a reciprocating manner in the direction of arrow d along the base 13, which is carried on turning shaft 12, or on turning bracket 19. Arm 17, which has tool gripping claws 15, 16 on the respective ends thereof, is rotated about rotary shaft 33 in the manner illustrated by arrow e, and moving support frame 31 (not shown in FIG. 8 but shown in FIG. 5) reciprocates relative to moving member 14 in the direction of arrow f.

In practice, the distances a and b, as illustrated in FIG. 8, can be varied. In this context, distance a is the perpendicular distance between the central axis of tool T and that of spindle 5, and distance b is the perpendicular distance between the axis of spindle 5 and the annular groove 36. In accordance with the possible variation of distances a and b, the central turning point O of turning shaft 12 is shifted, and consequently the angle of inclination of that shaft is changed with respect to the X, Y, and Z axes. Thus, the practical ranges for the angle of inclination of the axis of the turning shaft is about 50° to about 55° relative to the X axis, from about 38° to about 42° relative to the Y axis, and from 0° to about 60° relative to the Z axis.

Next, the operation of the automatic tool changing apparatus according to the invention will be described.

Firstly, the advancing/retreating unit 25 comprising an air cylinder or the like moves the moving member 14 rearward in the Y-axis direction and the tool gripping claw 15 of the arm 17 is engaged with the annular groove 36 of the tool T at the tool changing station A of the magazine proper 6 (see Fig.2). Then, the moving frame 31 is projected in the X-axis direction away from the spindle axis by the advancing/retreating unit 32 comprising an air cylinder or the like so that the tool T is removed from its receiving pot 10 and then the moving member 14 is moved forward into the original position. With the moving member 14 returned into the original position, the turning shaft 33 of the arm 17 is caused to make a half turn by the turning unit 35 comprising an actuator or the like and then the moving frame 31 is again moved in the X-axis direction toward the spindle axis. As a result, the tool T is received in the standy pot 37 and it is placed in a standby condition.

Figure 7:
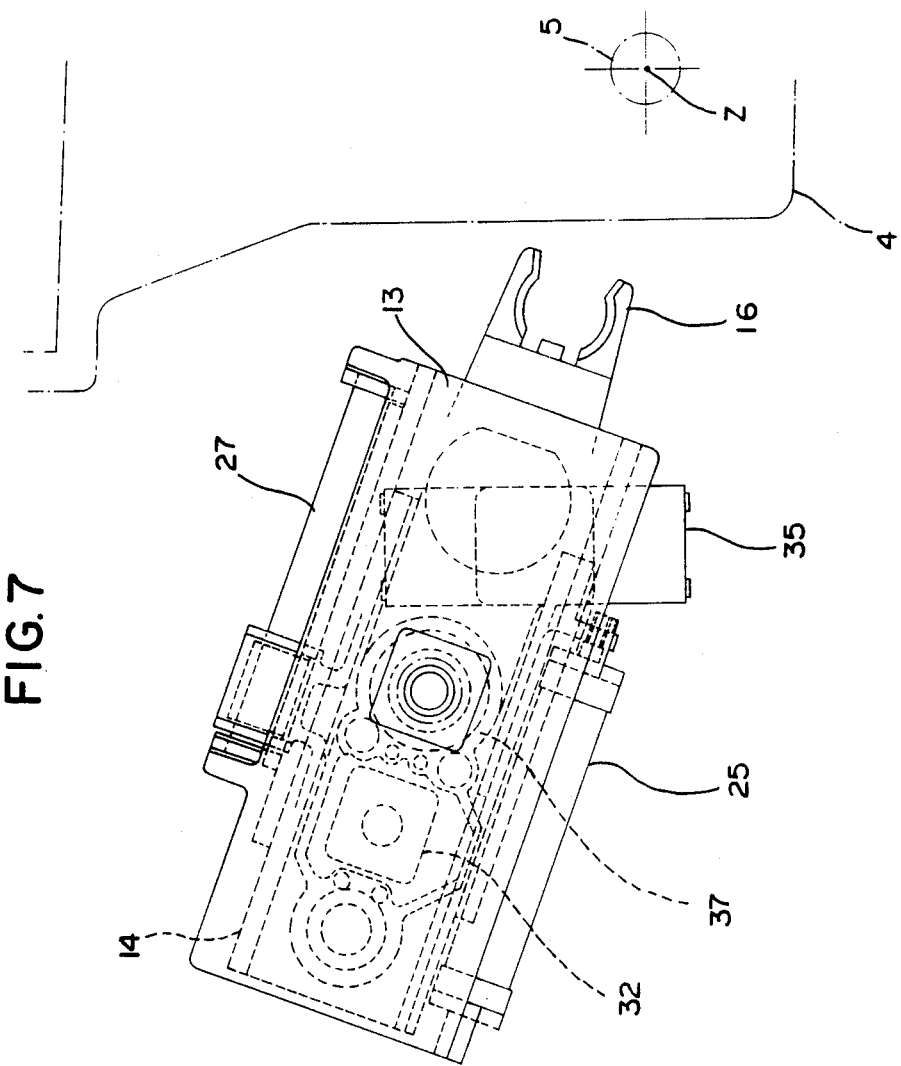
FIG. 7 is a plan view showing the condition in which the tool gripping unit is turned toward the spindle side.

On the other hand, when it is desired to replace the tool T-1 carried by the spindle 5 and used for the preceding operation, the base 13 is turned through a predetermined angle by the turning gear 18 comprising a geared motor or the like, through the turning shaft 12 and the turning bracket 19. Thus, by virtue of the spiral movement of the base 13, the other idling tool gripping claw 16 is directed to cross the spindle axis at right angles as shown in FIG. 7 and then the moving member 14 is moved forward in the same manner as mentioned previously, thus causing the tool gripping claw 16 to engage with the annular groove 36 of the tool T-1. Thereafter, the moving frame 31 is moved downwardly away from head 4 and the tool T-1 is removed from the spindle 5. In this condition, the tool T received in the standby pot 37 for the next operation is also removed simultaneously from the standby pot 37 by the tool gripping claw 15. Then, the arm 17 is caused to make a half turn so that the axis of the tool T concentrically aligns with the spindle axis (Z axis) and the axis of the tool T-1 concentrically aligns with the axis of the standby pot 37. Then, the arm 17 is retreated, thereby inserting the tool T into the spindle 5, and the moving member 14 is also retreated, thus completing the replacement of the tool T-1 with the tool T.

The base 13 is again turned into the original position and an operation is performed so that the next tool is readied and the used tool is accommodated in the corresponding pot 10 of the magazine proper 6. This operation takes place during the machining operation by the tool T, and also the roller chain 9 is fed one pitch so that the next tool T-2 is brought to the tool changing station A. Thereafter, the same operations as mentioned previously are performed so that the next tool T-2 is received in the standby pot 37 and the used tool T-1 is received in the pot 10 from which the tool T-2 has been removed.

The above-described embodiment is only one example of the present invention. For instance, while the magazine proper is vertically positioned so that the axes of the accommodated tools are perpendicular to the spindle axis, it may be arranged in an inclined position so as to further increase the number of tools to be accommodated. In this case, it is possible to arrange the magazine so that at least the axis of the tool at the tool changing station extends horizontally, as in the case of the present embodiment, or the tool axis need not necessarily be perpendicular to the spindle axis. The apparatus of the present embodiment can be used as such in the former case, and the apparatus will be used after necessary modification in the latter case.

From the foregoing description it will be seen that in accordance with the present invention there is an advantage in that a series of operations of a tool changing apparatus, including the forward and backward movements, in-and-out movements and half-turn and spiral movements of its component parts, bring tool gripping claws into their respective positions which are perpendicular to the spindle axis, and the latter and the tool axis are preferably arranged to cross each other at right angles with a spacing therebetween and this has the effect of accomplishing the tool changing operation smoothly, positively and rapidly with a simple construction. There is another advantage in that the space on the table can be utilized efficiently with the resulting advantage, from the operating efficiency and safety points of view, that a greater number of tools can be accommodated, and that the installation space of a machine tool can be reduced.

What is claimed is:

1. In an automatically controlled machine tool in which the axis of a spindle and the axis of a tool at a tool changing station of a magazine proper are arranged preferably to cross each other at right angles with a predetermined spacing therebetween, an automatic tool changing apparatus rotatable about a turning shaft disposed between said spindle axis and said tool axis, said turning shaft having an axis inclined at an acute angle relative to each of said spindle axis and said tool axis, movable support means linearly movably carried on a base mounted on said turning shaft, said linear movement being perpendicular to the axis of said tool and of said spindle, and an arm having tool gripping claw means at opposite ends thereof, said arm pivotally carried on said movable support means at a pivot point between said ends so as to be rotatable through at least a half turn and movable in a direction perpendicular to the direction of movement of said movable support means, and wherein in the tool changing operation said gripping claw means are alternately movable from a first position adjacent the tool axis to a second position adjacent the spindle axis and are positioned so as to cross each of said spindle axis and said tool axis, respectively, at right angles.

2. An apparatus according to claim 1, wherein said movable support means includes a standby pot for holding a tool and positioned to be concentrically oriented with an opening defined by one of said tool gripping claw means of said arm, whereby a tool just before changing or a tool just after changing is temporarily received and held in said standby pot.

3. An apparatus according to claim 1, wherein said magazine proper includes a plurality of pots arranged in a loop form on intermittent feed means to accommodate a large number of tools.

4. An apparatus according to claim 1, further comprising movable frame means mounted on said movable support means to move in and out in a direction perpendicular to the direction of forward and backward movement of said movable support means, and wherein said arm having the tool gripping claw means at the ends thereof is pivotally carried on a pivot mounted on said movable frame means so as to make at least a half turn relative to said pivot.

5. An apparatus according to claim 1, wherein each of said tool gripping claw means includes a pair of opposed curved members movable toward and away from each other and formed into a fork shape, and said curved members are adapted to laterally elastically engage with an annular groove formed in a body portion of each of said tools to permit said tools to be gripped and carried by said claw means.

6. An apparatus according to claim 3, wherein the axes of said tool accommodating pots are directed horizontally, and wherein said spindle axis is directed vertically.

7. An apparatus according to claim 3, wherein said magazine proper is movable vertically on one side of a column of said machine tool and said loop form is oriented so as to be inclined with respect to said spindle axis, and wherein the axes of said tool accommodating pots are arranged in a direction perpendicular to an inclined surface of said magazine proper.

8. An apparatus according to claim 1, wherein the machine tool includes a table movable in two perpendicular directions defining a table plane, and the axis of said turning shaft is inclined at an acute angle relative to the table plane.

* * * * *